July 5, 1938.  J. TJAARDA  2,122,445
AUTOMOBILE BODY
Filed Sept. 21, 1935  3 Sheets-Sheet 3
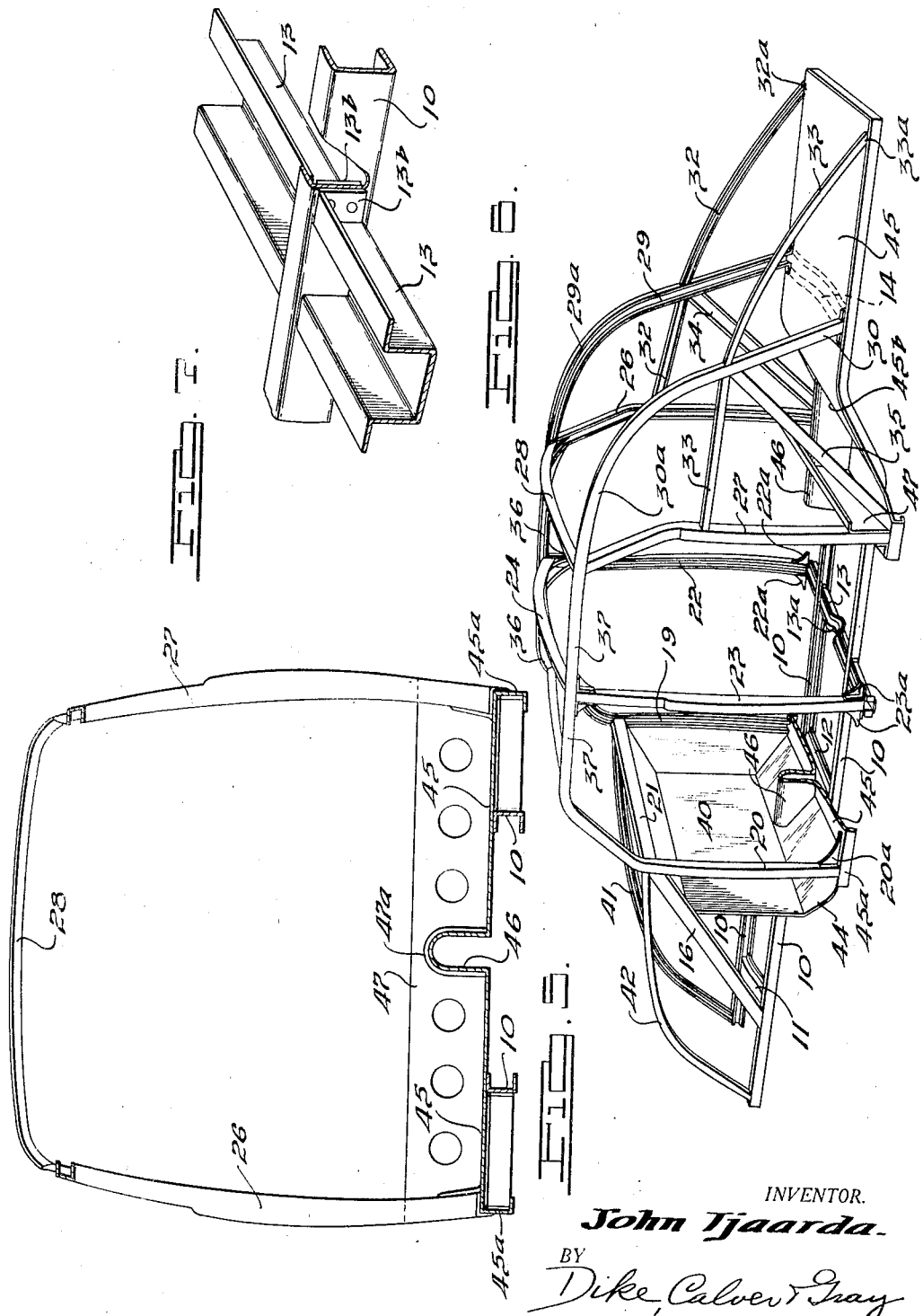
INVENTOR.
John Tjaarda.
BY
Dike, Calver & Gray
ATTORNEYS.

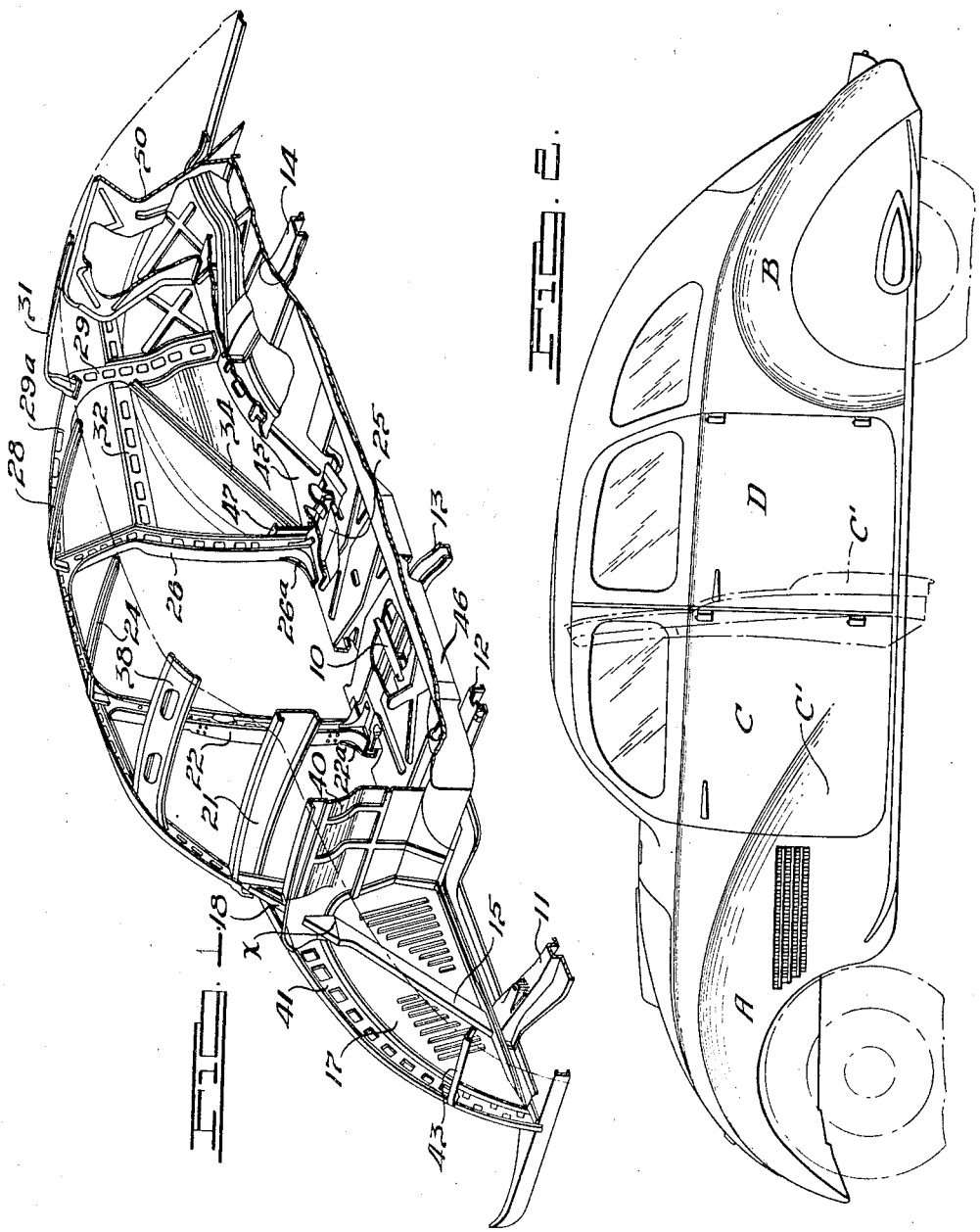

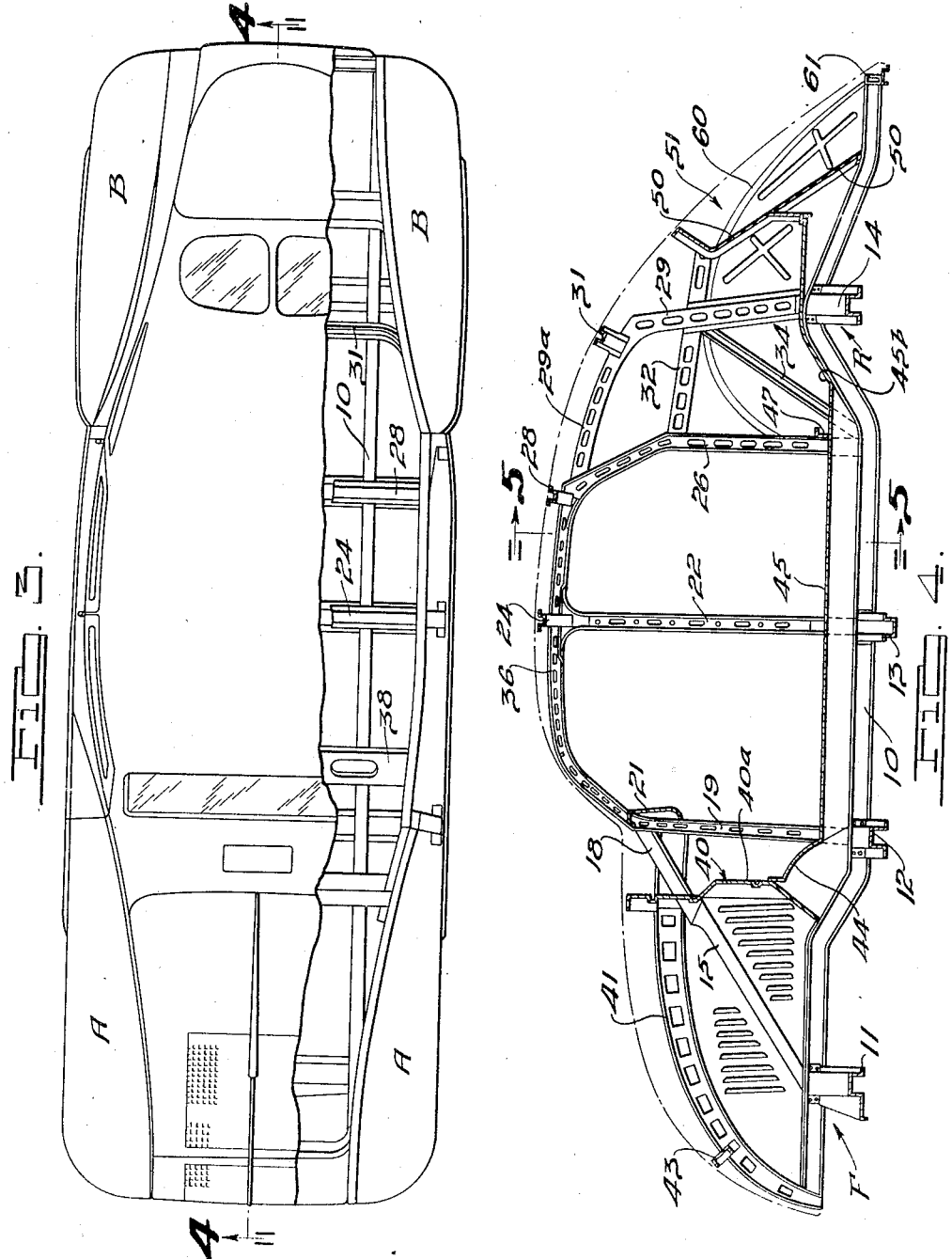

Patented July 5, 1938

2,122,445

UNITED STATES PATENT OFFICE 2,122,445

AUTOMOBILE BODY

John Tjaarda, Birmingham, Mich., assignor to Briggs Manufacturing Company, Detroit, Mich., a corporation of Michigan Application September 21, 1935, Serial No. 41,558

2 Claims. (Cl. 296—28)

This invention relates to automotive vehicles and more particularly to improvements in the frame and body structure of automobiles whereby substantial elimination in weight and better distribution of loads may be secured without sacrificing strength and durability while at the same time permitting the application of full streamlining principles to the design of the body. While embodying improvements over my prior application, Serial No. 736,139, filed July 20, 1934, certain important features of the invention disclosed in said application are applied to the construction of a body and chassis design for mounting the engine at the front end thereof.

An object of the present invention is to provide a unitary body and main frame or chassis structure having means for mounting the engine at the front end thereof and so designed and constructed as to cause substantially all load stresses to be transmitted and distributed throughout the entire unit whereby the upper body structure forms with the base or chassis frame members a unitary load carrying carcass, thus permitting the base frame and upper body structure to be greatly reduced in weight while preserving maximum strength.

A further object of the invention is to provide an improved automobile body in which the entire side walls and roof of the structure form with the chassis frame a unitary part of the stress and load carrying frame of the vehicle.

Another object of the invention is to provide improved load carrying framing for an automobile wherein the base is in the form of a pair of spaced longitudinally extending truss or torque members, and wherein torsional stresses and forces are transmitted from said trusses or torque members and in part absorbed by reinforced bottom, side and top body walls forming with the said truss members a unitary load carrying frame.

A further object of the invention is to provide a unitary body and frame carcass of relatively light weight and of great strength and embodying skeleton framing including spaced longitudinally extending bottom truss members having transverse rib members rigidly mounted thereon and which form portions or lower sides of continuous framing extending around the four sides of the tonneau, thus embracing the passenger compartment and functioning with said longitudinal truss members as load carrying units.

A further object of the invention is to provide an automobile constructed in improved manner for mounting the engine at the front end thereof and having fully streamlined characteristics, and wherein maximum strength and lightness are secured by providing an improved unitary frame and body carcass designed to distribute load stresses and forces uninterruptedly throughout the enclosing frame of the vehicle body, and wherein the frame structure is so designed and arranged as to provide forward and rear bulkheads effective to consolidate stresses transmitted through the framing.

Another object of the invention is to provide a body of the foregoing character in which the contour of the front fenders extends into the front doors, thereby greatly increasing the streamlined effect and at the same time reducing wind resistance.

Other objects and advantages of the invention will appear from the following description and appended claims when considered in connection with the accompanying drawings forming a part of this specification.

In said drawings:

Fig. 1 is a fragmentary central longitudinal sectional view, shown in perspective, and illustrating a unitary body and frame structure embodying the invention.

Fig. 2 is a longitudinal side elevation of an automobile body embodying the invention.

Fig. 3 is a top plan view, partly broken away, of the body of Fig. 2.

Fig. 4 is a vertical longitudinal section, taken substantially along the line 4—4 of Fig. 3 in the direction of the arrows.

Fig. 5 is a vertical transverse section taken substantially along the line 5—5 of Fig. 4 in the direction of the arrows.

Fig. 6 is a perspective view illustrating schematically in simplified fashion a skeleton carcass embodying the main features of the frame structure.

Fig. 7 is a fragmentary perspective view, on an enlarged scale, of a detail of the frame structure.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the present preferred form of the invention, herein illustrated by way of example, the frame structure is designed for a fully streamlined automobile having the engine thereof mounted in the front end adjacent the front steering wheels. The invention is shown is applied to a four door sedan but it will be understood that it may be adapted with suitable changes in design to other types of automotive vehicles. The present vehicle body is distinguished in at least one important respect from conventional types of automotive vehicles by the elimination of the customary chassis and body units in which the chassis is designed to receive and carry all load stresses and the body merely forms an enclosure for housing the passenger compartment. In the present instance the load carrying frame of the vehicle includes as a unitary structure not only the base frame but also the framing extending therefrom and which embraces the passenger compartment of the vehicle, and the stresses are transmitted uninterruptedly through the framing and consolidated at the front and rear bulkheads beyond opposite ends of the passenger compartment.

Referring now particularly to the drawings, it will be seen that there is provided a pair of spaced longitudinally extending lower truss members or chords 10 which, as shown, are in the form of steel sills. Rigidly mounted on the longitudinal truss members 10 and suitably spaced longitudinally of the vehicle are a series of transverse struts or ribs 11, 12, 13 and 14, these being preferably in the form of structural members of channel shape, all of which are fixed to the truss members 10 in any suitable manner such as that shown in detail in Fig. 7. Each truss member 10 is supported at the two longitudinally spaced points 11 and 14 and provides a lower chord extending between these points of support. Extending upwardly and rearwardly from opposite ends of the transverse bar 11 and rigidly fixed thereto, as by welding, are front diagonal brace members or front inclined posts or struts 15 and 16, these brace members being formed by stamping. The upper ends of the brace members 15 and 16 are butt welded at x to the ends of channel members or struts 18 which extend through the dash and are connected to front sloping pillars or posts 19 and 20 which are rigidly fixed, as by welding, to the opposite ends of the transverse bar or channel member 12. The pillars 19 and 20, as shown, are in turn welded to the opposite ends of a transverse channel member 21 forming the lower margin of the windshield opening. Extending upwardly from the transverse base member or rib 13 at opposite ends thereof are substantially vertical center pillars 22 and 23 which are rigidly secured to the ends of the member 13 as by welding. The upper ends of these pillars or posts 22 and 23 are joined by a transverse metal cross-member or roof bow 24 welded or otherwise secured to the upper ends thereof, see Figs. 1 and 6. Extending upwardly from the transverse base member or rib 25 (see Fig. 1) are upright intermediate rear tonneau posts or pillars 26 and 27 having forwardly sloping upper portions (see Figs. 1 and 6) which are fixed to the opposite ends of the bar 25, as by welding. The upper ends of the pillars or intermediate rear tonneau posts 26 and 27 are rigidly joined together by a transverse bar or roof bow 28 which may be fixed to the upper ends of the pillars by welding. Extending upwardly from the rearmost transverse base member or rib 14 at opposite ends thereof are rear posts or pillars 29 and 30 which are rigidly secured to the ends of the member 14 as by welding. The upper ends of the pillars 29 and 30 are curved forwardly at 29a and 30a to form continuations of the roof rails and are connected, respectively, to the pillars 26 and 27 by welding. A transverse cross-member or metal roof bow 31 is connected at opposite ends to the pillars 29 and 30 at points between the upright portions of these pillars and the forwardly extending portions 29a and 30a thereof.

The pillars 26 and 29 on one side and the pillars 27 and 30 on the other side are connected together at points intermediate their upper and lower ends by longitudinally extending channel members or brace bars 32 and 33, respectively. In Fig. 6 these bars 32 and 33 extend rearwardly beyond the pillars 29 and 30 and are inclined downwardly and secured to the base frame or floor portion of the rear deck at points 32a and 33a. In Fig. 4 the wheel housing flange 60, stiffened to support the rear fender, forms a mechanical continuation of the struts or bars 32 and 33, extending rearwardly and downwardly to the rear transverse tie bar 61 joining the rear terminal ends of the sills 10. Rearwardly inclined channel members or braces 34 and 35 connect the pillars 26 and 29, and 27 and 30, respectively, at the base of each of the pillars 26 and 27, at their lower ends and at the points of intersection of the members 32 and 33, at their upper ends. The pillars are preferably stamped or pressed from sheet steel blanks into channel or other structural form.

A longitudinal roof rail or upper chord member 36 serves to rigidly join together the pillars 19, 22 and 26. In like manner, the pillars 20, 23 and 27 are rigidly joined together by a longitudinal roof rail, header, or upper chord member 37. It will be seen that the roof rails 36 and 37 are secured in a rigid manner by welding to the forward extensions 29a and 30a, respectively, of the rear pillars 29 and 30. Thus, the rear pillars 29 and 30, with their extensions 29a and 30a, form substantially integral continuations of the upper chords 36 and 37 as well as the forward pillars 19 and 20 and struts or braces 15, 16 and 18. It will be noted, Fig. 1, that the roof rails are interconnected by a transversely extending windshield header member 38 located above and in a plane at the rear of the transverse belt bar 21, the header 38 and the bar or panel 21 providing the top and bottom framing for a windshield.

In the present construction, the engine is located at the front and in advance of a one-piece dash 40, there being a jog 40a in the dash to give clearance for the engine and associated parts. The engine is mounted on the front cross member 11. The forward portion of the body frame structure includes two forwardly and downwardly curved brace members or channels 41 and 42 which are connected as by means of welding to the forward ends of the longitudinal truss members 10. The lower flanges of the members 41 and 42 provide means for receiving and supporting the front fenders which are attached to the flanges in any suitable manner. A transversely extending channel member or brace 43 is provided and is secured at its opposite ends to the members 41 and 42. An inclined toe board 44 is secured at its upper edge to the jog 40a of the dash. The skeleton frame structure including the longitudinal truss members 10 and transversely extending cross-frame members or trusses 12, 13, 14 and 25 are covered by a metal floor pan 45 which extends throughout the length of the carcass from the toe board 44 rearwardly to a suitable point beyond the rear ends of the pillars 29 and 30. It will be noted (see Fig. 5) that the floor pan is provided with side longitudinal flanges 45a and that centrally thereof the metal of the floor pan is shaped to provide a longitudinal tunnel 46 which extends from the toe board 44 rearwardly to the upwardly inclined portion 45b of the floor pan. The transverse strut or rib 13 is provided with a centrally disposed depressed portion 13a which cooperates with the tunnel 46 to receive, if desired, a longitudinal torque tube through which the drive shaft extends. The pillars 26 and 27 are braced, transversely, by means of an upstanding channel shaped tie plate 47 which engages the rear faces or flanges of the pillars and is secured thereto, as by means of welding. The plate 47 is preferably notched out at its central portion to fit over the tunnel 46 and is flanged at 47a so as to provide means for securing the plate to the tunnel by means of welding, see Fig. 5. If desired, the floor pan 45 may be secured either by welding, riveting or bolts to the various truss and brace members of the under-structure of the skeleton frame. The various pillars are reinforced at their points of connection with the transverse base members or ribs by means of suitable gusset plates. In Fig. 1, gusset plates 22a and 26a are provided for the pillars 22 and 26, respectively. As seen in Fig. 6, similar gusset plates are provided at 20a and 23a for the pillars 20 and 23, respectively. These various gusset plates are welded to the pillars and to the transverse base members so as to provide a rigid and sturdy construction.

Referring particularly to Fig. 4, it will be noted that the rearwardly and downwardly extending channel members 32 and 33 are secured to and support a cross-plate 50 which forms a rear wall or partition of a spare tire compartment 51. It will also be seen that the floor pan 45 is connected to a portion of this partition. The lower flanges of the members 32 and 33 provide means for the attachment of the rear fenders.

Referring particularly to Fig. 7 wherein there is shown a detail of the connection between the longitudinal truss members 10 and the transverse base member or channel 13, it will be seen that the member 13 is split and flanged at 13b so as to provide means for attaching the member to the longitudinal truss member. As shown, the flanges 13b abut opposed faces of the central web of the longitudinal truss member and are secured thereto and to one another by riveting. If desired, however, these parts may be connected together by welding or in any other similar manner.

Referring particularly to Fig. 2, A represents a front fender and B a rear fender, whereas C and D represent, respectively, the front and rear doors at the left side of the body. The front door C is externally contoured at C' to form a continuation or rear extension of the front fender contour. In reality the front fender A terminates at the front edge of the door C but by so contouring the door the effect is as though the front fender extended continuously in a rearward direction beyond the front edge of the door and overlapped the same.

By reason of the construction of the preferred form of body illustrating the present invention, front and rear bulkheads are provided beyond opposite ends of the passenger compartment. Two bulkheads are provided at the front and the rear of the vehicle, indicated respectively by the letters F and R. Said bulkheads are formed by two transversely extending members 11 and 14 and they serve to brace laterally the bridge trusses formed on the sides of the vehicle by the upper and lower chords and vertical members, and to support the trusses so formed at the points of juncture of said chords. By providing the bulkheads there are thus furnished, first, supports for the trusses to ensure their proper truss action and, second, rigid members to which the front and rear wheel suspensions are secured. It will be understood that the top panel and the body panels, when secured to the carcass, together with the floor pan, provide supporting means to receive and transmit the stresses and forces through the entire structure, thus relieving the chassis from the burden of receiving all such forces and stresses as in the present types of bodies and frame constructions wherein the chassis and frame receive all of the forces and the body merely provides a passenger compartment wholly supported by the frame. In this respect the present construction is generally like that of my aforementioned application Serial No. 736,139, filed July 20, 1934. The longitudinal strains and stresses from the cross member 15 at the rear bulkhead R are transmitted through the members 29, 29a, 36, 18 and 15 to the cross member 11 at the location of the front bulkhead F thus distributing these forces through the framing structure and concentrating them at the front bulkhead. Strains and stresses from the front bulkhead are transmitted in a similar manner through the various members just mentioned to the rear bulkhead.

Thus, in one of its broader aspects my invention contemplates providing a novel unitary body and chassis structure composed of two simple trusses disposed in two vertical planes longitudinally of the vehicle, the trusses being rigidly braced laterally and supported at their extremities by two load transmitting bulkheads. Each of said trusses includes two longitudinal members which are rigidly braced in transverse, substantially vertical direction, the extremities of said members converging and being connected together. The bulkheads are located at the points of connection of said converging extremities. The passenger compartment is located within the space defined by said trusses, and the flange system is of such a character as not to interfere with the commonly desired arrangement of doors and windows.

Although only one embodiment of my invention is herein illustrated and described, the same is capable of being modified without departing from the spirit of my invention. For instance, the curvature of said converging longitudinal members may be changed so that the lower member has a greater curvature than the upper member. The angles, which said converging members make at their connected extremities, may be different at the front and at the rear of the vehicle. In manufacture it may be found more convenient to make the longitudinal members in sections, and in some instances such sections may be made integral with the vertical truss members, so that continuity of the longitudinal members is effected only after the trusses are assembled.

I claim:
1. In a vehicle having a passenger compartment, a pair of spaced longitudinally arranged and laterally braced trusses, each of said trusses being adapted to be supported at two points and comprising a lower chord extending between said points of support, a front post connected at its lower end to said lower chord and extending vertically therefrom, an intermediate rear tonneau post connected at its lower end to said lower chord and extending vertically therefrom, its upper portion being bent to form a forwardly directed inclined portion, an upper chord having a downwardly bent front portion merging into said front post, said upper chord extending rearward and attached to the upper end of the forwardly inclined portion of said intermediate rear tonneau post, a substantially vertical center pillar attached at its ends to said lower and said upper chords, a front inclined brace member attached to said upper chord substantially at the point of merging of said chord into said front post and to the lower chord substantially at the point of truss support, and a rear inclined post attached to said upper chord at the place of juncture of said chord and the intermediate tonneau post and to the lower chord at the point of truss support.

2. The structure as defined in claim 1, comprising a transverse member extending between the points of juncture of the upper chords and front posts of the trusses, said transverse member forming the lower margin of an unobstructed windshield opening.

JOHN TJAARDA.